UNITED STATES PATENT OFFICE.

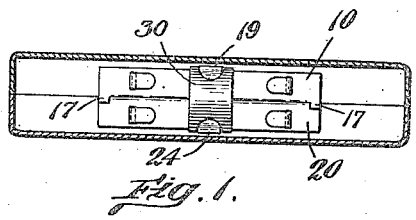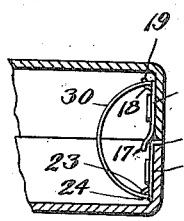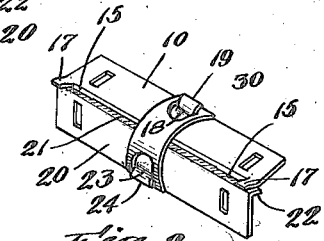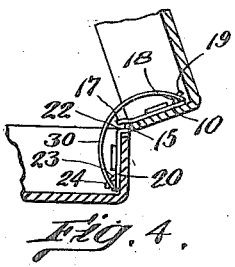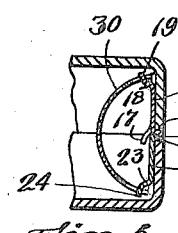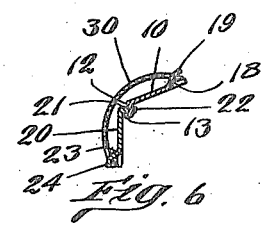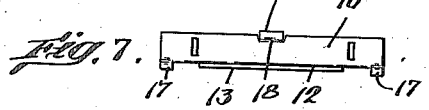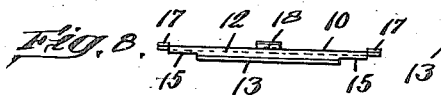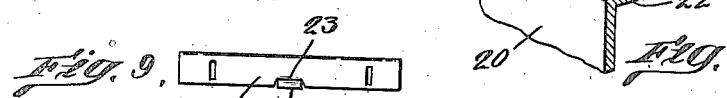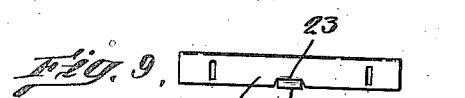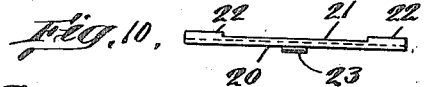

FREDERICK W. SAWORSKI, OF BOSTON, MASSACHUSETTS.

ARTICULATORY JOINT.

1,221,770.  Specification of Letters Patent.  Patented Apr. 3, 1917.

Application filed May 4, 1916. Serial No. 95,443.

*To all whom it may concern:*

Be it known that I, FREDERICK W. SAWORSKI, a citizen of the United States, residing at Boston, in the county of Suffolk and State of Massachusetts, have invented an Improvement in Articulatory Joints, of which the following is a specification.

This invention relates to articulatory joints, and has for its object the construction of an articulatory joint for the closing lid for a box, although adapted for other uses in place of a hinge, which may be concealed or confined entirely within the boundaries of the box; that is to say, it does not project like a hinge. Furthermore, to construct such a joint having associated with it a spring element having the functions of "a dead-center spring" which holds the joint members in both open and closed positions, and acts to assist in moving said members, respectively, into these positions. That is to say, it acts at one side of the center to close the members, and at the other side of the center to open the members, force being required only to move the members from either open or closed position just past the dead-center, the spring element continuing the movement to completion.

My newly-invented articulatory joint comprises three elements, namely, two joint elements or members, and a spring element, these elements being compactly associated together.

Figure 1 is a front elevation of an articulatory joint embodying this invention.

Fig. 2 is a perspective view of the same.

Fig. 3 is an enlarged end view of the same in closed position.

Fig. 4 is a similar view in open position.

Figs. 5 and 6 are vertical sectional views in open and closed positions, respectively, and taken through the spring.

Fig. 7 is a plan view of one of the joint members.

Fig. 8 is an edge view of the same.

Fig. 9 is a plan view of the other joint member.

Fig. 10 is an edge view of the same.

Fig. 11 is a perspective detail view.

The joint member 10 has on its longitudinal edge, adjacent the other member, an angularly formed projection 12, 13, the portion 12, thereof, being arranged substantially at right angles to the body of the member and extended rearward, and the portion 13, being arranged substantially at right angles to the portion 12 and extended downward. This projection is arranged intermediate the length of the body and is made quite long compared with the length of the member.

Said member 10 also has, on said meeting edge, at each end of said angular projection 12, 13, a projection 15, 15, which extends rearward at substantially right angles to the body for a short distance, said projections 15, 15, being in continuation of the portion 12 of the projection 12, 13, and terminating a short distance from the ends of the member.

Said member 10 also has on said meeting edge, at each end, an ear 17, 17, which is angularly related to the body, and extends downward.

Said member 10 has on its opposite edge, intermediate its length, a short angularly-formed projection 18, 19, which is extended forward and upward to form a hook.

The joint member 20 has on its longitudinal edge, adjacent the other member, a projection 21 which extends rearward, at right angles to the body, and is adapted to engage the angular projection 12, 13, and is coextensive therewith.

Said member 20 also has a projection 22, at each end, which is extended rearward at right angles to the body, in continuation of the projection 21, to the end of the member, and for a greater rearward distance, and said projections 22, 22, engage the projections 15, 15, when the joint members are assembled. By these projections, movement of the members into open position is limited. The ears 17, 17, on member 10, extends over the body of member 20, and limit the movement of the members in their closed position, by engaging said member, unless such movement is limited by the closing lid of a box engaging the body thereof, which is usually the case.

Said member 20 also has, intermediate its length, on its opposite edge, an angularly formed projection 23, 24, which forms a hook. The members 10 and 20 are transversely separable, and adapted to be articulated together, in the manner shown, and are held in articulated relation by means of a spring element. The interengaging projections, as shown, serve to hold said members, when articularly related, against longitudinal movement with respect to each other.

The spring element 30 is of semicircular formation, and it has holes at each end to engage, respectively, the hooks 18, 19, and 23, 24, for interlocking engagement, said holes being here shown as semicircular and having a straight hook-engaging edge. Said spring serves and acts as a dead-center spring. It has a normal tendency to contract and upon contracting, holds the two members 10 and 20 in either open or closed position, but will yield to permit movement of said members into the other position, and when said members are so moved, the spring acts to assist such movement in either direction. It will be observed that force will be required to move the members to just past the dead-center, then the spring acts to continue such movement until completion. Each member 10 and 20 has perforations in its body to admit of its being attached to a box or other object.

I claim:—

1. The articulatory joint herein described, comprising two transversely separable joint-members articulated together, and a semicircular dead-center spring connected at its extremities, respectively, to said members, which exerts its force on said members to hold them in open and closed position, and which also holds them in articulated relation.

2. The articulatory joint herein described, comprising two joint members, one having an angular projection on its meeting edge, and the other having projections on its meeting edge adapted for interengagement with said angular projection, whereby said members are articulated together and held in longitudinal relation to each other, and a semicircular interlocking spring, the extremities of which are connected, respectively, with said members to exert its force on said members and holds them interlocked in articulated relation.

3. The articulatory joint herein described, comprising two joint members, one having an angular projection on its meeting edge, and the other an interengaging projection on its meeting edge for coöperation with said angular projection, whereby said members are articulated together, and held in longitudinal relation to each other, limiting stops arranged on said members for limiting their opening and closing movement, and a semicircular interlocking spring, the extremities of which are connected, respectively, with said members, and which exerts its force on said members and holds them interlocked in articulated relation.

In testimony whereof, I have signed my name to this specification, in the presence of two subscribing witnesses.

FREDERICK W. SAWORSKI.

Witnesses.
B. J. Noyes,
H. B. Davis.